US006456891B1

(12) United States Patent
Kranich et al.

(10) Patent No.: US 6,456,891 B1
(45) Date of Patent: Sep. 24, 2002

(54) SYSTEM AND METHOD FOR TRANSPARENT HANDLING OF EXTENDED REGISTER STATES

(75) Inventors: Uwe Kranich, Kirchheim (DE); David S. Christie, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/428,614

(22) Filed: Oct. 27, 1999

(51) Int. Cl.$^7$ ............................................. G05B 19/18
(52) U.S. Cl. ......................... 700/2; 700/5; 700/18; 700/23; 700/82; 700/86; 700/4; 712/214; 712/215; 712/219; 712/204; 712/208; 711/100; 711/200; 711/206; 711/212; 711/220; 709/100; 709/101; 709/106
(58) Field of Search ........................ 700/2, 3, 4, 5, 700/18, 86, 82, 23; 712/214–215, 218, 219–225, 200, 204, 208, 209, 210–212, 228, 234–245; 709/1, 100–106; 711/1–2, 100, 200, 206–212, 220

(56) References Cited

U.S. PATENT DOCUMENTS

| 5,848,284 | A | * | 12/1998 | Sharangpani | ............ | 346/135.1 |
|---|---|---|---|---|---|---|
| 5,935,240 | A | * | 8/1999 | Mennemeier et al. | ........ | 345/501 |
| 5,956,751 | A | * | 9/1999 | Lai | ............... | 711/172 |
| 6,092,175 | A | * | 7/2000 | Levy et al. | ................. | 712/215 |
| 6,157,996 | A | | 12/2000 | Christie et al. | ............. | 712/218 |
| 6,199,155 | B1 | | 3/2001 | Kishida et al. | ............. | 712/218 |
| 6,201,997 | B1 | * | 3/2001 | Giers | ......................... | 700/111 |
| 6,230,259 | B1 | | 5/2001 | Christie et al. | ............ | 712/228 |
| 6,233,492 | B1 | * | 5/2001 | Nakamura et al. | ............. | 700/2 |
| 6,327,508 | B1 | * | 12/2001 | Mergard | ........................ | 700/1 |
| 6,347,253 | B1 | * | 2/2002 | Fujita et al. | ................. | 700/173 |

* cited by examiner

Primary Examiner—Ramesh Patel
(74) Attorney, Agent, or Firm—Conley, Rose & Tayon, PC; B. Noël Kivlin

(57) ABSTRACT

A system and method for transparent handling of extended register states. A set of additional registers, or an extended register file, is added to the base architecture of a microprocessor. The extended register file includes two dedicated registers and a plurality of general-use registers. The extended register file is mapped to a region in main memory. One dedicated register of the extended register file stores the physical base address of the memory region. Another dedicated register of the extended register file is used to store bits to indicate the status of the extended register file. A set of extended instructions is implemented for transferring data to and from the extended register file.

43 Claims, 8 Drawing Sheets

| | |
|---|---|
| fx2rmov | Moves data from extended register to regular register |
| r2fxmov | Moves data from regular register to extended register |
| fxinv | Invalidates extended register file (M = 0) |
| fxwbinv | Copies extended register contents to memory, then invalidates extended register file |

Fig. 4

| Function | M | ST | SN |
|---|---|---|---|
| Load ERF 1st time | 1 | 0 | 0 |
| Exception or IRQ | X | 1 | 1 |
| if snoop hit and modified => Copyback(MREG_BASEADR) | 0 | 1 | 0 |
| if snoop hit and clean => No CopyBack | 0 | 1 | 0 |
| if no hit | X | 1 | 1 |
| | | | |
| After ISR-New Access | | | |
| STC = 1 => Compare phys addresses. (MREG_BASEADR) | X | 1 | X |
| If match & MOD == 0 => Don't Copyback (MREG_BASEADR) but reload | 1 | 0 | 0 |
| If match & MOD == 1 => No reload | 1 | 0 | 0 |
| If no match & MOD == 0 => Don't Copyback (MREG_BASEADR) but reload | 1 | 0 | 0 |
| If no match & MOD == 1 => Copyback (MREG_BASEADR) and reload | 1 | 0 | 0 |
| | | | |
| Next Accesses | | | |
| STC == 0 => just access ERF (No Adr Compare) | | | |
| SNO == 0 => No Update between ERF and Memory | | | |

Fig. 5

SYSTEM AND METHOD FOR TRANSPARENT HANDLING OF EXTENDED REGISTER STATES

BACKGROUND OF THE INVENTION

1. Field of the Invention

This invention relates to microprocessors, and more particularly, to the handling of general-purpose and extended register files.

2. Description of the Relevant Art

Since the introduction of the 8086 microprocessor, several successive generations of the X86 architecture have been developed, with further developments occurring on a continuous basis. With each new generation of the X86 architecture, microprocessor manufacturers have attempted to maintain backward compatibility in order to allow software developed for previous generations of the architecture to run on the most current generation. Maintaining this compatibility has forced a number of compromises in successive generations of the architecture.

An X86 microprocessor is referred to as a CISC (Complex Instruction Set Computing) machine, due the type of instruction set employed. The instruction set of the X86 includes a relatively large number of variable length instructions. A generic X86 instruction can include one to five prefix bytes, an operation code (opcode) field of one to two bytes, and addressing mode (Mod R/M) byte, a scale-index-base-byte, a displacement field and an optional immediate data field. The shortest X86 instructions are only one byte in length, and consist of a single opcode byte. These instructions can access standard, or general-purpose registers, to be discussed below, when executed by an X86 processor.

Nearly all microprocessor architectures, including the X86, feature a small, fast memory known as a register file, which is separate from system and cache memory. A register file is made up of a number of individual registers that are used for temporary storage during program execution. One of many typical uses of registers is the temporary storage of operands during arithmetic operations. Registers can be classified as general-purpose or dedicated. General purpose, or standard registers can store a number of different types of data, while dedicated registers have specific uses, and thus can only store certain, pre-designated data types.

Since the register file is located in the core of the microprocessor, accesses to it are typically much faster than accesses to main memory. Programs that are register intensive usually run significantly faster than an otherwise equivalent program that is main memory intensive. For this reason, it is advantageous to have a sufficiently large number of general-purpose registers. A significant weakness of the X86 architecture is the small number of general-purpose registers. While the X86 architecture includes many registers, a majority of these are dedicated to a particular use. The X86 architecture has only eight general-purpose registers that can be accessed by X86 instructions. Comparatively, typical RISC (Reduced Instruction Set Computing) microprocessors have thirty-two or more general-purpose registers. It would be desirable to add an extended file of general-purpose registers to the base X86 architecture in order to increase processor performance.

A primary consideration when adding registers to any microprocessor architecture, X86 included, is the interaction between the processor and the operating system. If an interrupt or exception occurs during program execution, the process employing the registers must be suspended. The register state must be saved to main memory where it can be retrieved once the process is allowed to resume. Control of the suspension, state save, and resumption of a process is typically performed by the operating system. Operating systems are programmed with a specific number of general-purpose registers in mind. Simply adding extra registers to the base architecture of a processor may not allow the operating system to save the register state of a suspended process using them. Reconfiguring the operating system to take advantage of additional registers can be very expensive and very time consuming. It would be desirable to add registers to the base architecture without changing the operating system. Such a method of adding registers should allow for the state of the additional registers to be saved whenever a process using them is suspended. Usage of the additional registers, including state saves, should be transparent to the operating system.

SUMMARY OF THE INVENTION

The problems outlined above are in large part solved by a system and method for transparent handling of an extended register context in accordance with the present invention. In one embodiment, a microprocessor includes an extended register file (ERF), which augments a general-purpose register file containing a limited number of registers. The ERF is mapped to a main memory region for context swaps, with the physical base address of the region stored in a base address register. The ERF also includes a status vector register for storing status bits. These status bits provide information about the state of the ERF. Additional instructions are added to the processor's instruction set for operations involving the ERF, although the extended registers can be used with arithmetic and logical instructions that are already present in the processor's instruction set. All operations involving the ERF are transparent to the operating system. ERF operations are instead handled by application software that is designed with the extended registers in mind.

In one particular embodiment, a general-purpose register receives and stores a virtual base address for the memory region that the ERF it to be mapped. This virtual address is issued by the application software. The virtual address is then translated into a physical address and stored in the base address register of the ERF. The ERF also contains a status vector register, which contains at least three status bits. One of these status bits is used to indicate whether the ERF is active. If the active bit is not set, then the ERF is available for use by any process of the application software. A second status bit, referred to as the state change status bit, when set, indicates that an interrupt or an exception has occurred. A third status bit, when set, enables the base address register to be snooped during L1 cache snoops. In effect, the base address register behaves as one additional cache entry when the snoop enable bit is set. This behavior is important for memory coherency and context swaps, as will be detailed further below.

When the ERF is accessed for the first time, the active bit is set, while the other two status bits remain in their reset state. The process that is accessing the registers will own that register space. Accesses to the ERF will be private, and thus the contents of the ERF will not be coherent with the memory region to which it is mapped. If an interrupt or exception occurs, both the state change and snoop enable bits will be set in the status vector register. However, the register state will remain in the ERF, and a context swap will occur only if, subsequent to an interrupt or exception, a new process requests access to the ERF. If such a context swap occurs, the ERF context for the original process is copied back to the main memory region to which it is mapped. The new process will then have access to the ERF, and is mapped to a different memory region. If, after and interrupt occurs, no other process accesses the ERF, the original process can resume use of these registers without having to reload.

When the snoop enable bit of the status vector is set, the ERF can be snooped during L1 cache snoops. Since the ERF is mapped to main memory on an even block boundary, a single snoop of the base address register will cover the entire ERF. If a hit occurs during a snoop, the contents of the ERF will immediately be copied back to the mapped main memory region, and the active bit will be reset. This ensures coherency between the mapped memory region and the ERF. At this point, the ERF may be used by another process, although the resetting of the active bit does not imply that it actually will be used by another process. If a new process needs register access, the ERF will be loaded from the memory region to which the new process is mapped.

When a process has finished using the extended registers, the ERF may be deactivated by one of two special instructions. One of these instructions merely resets the active bit, while the other instruction copies the ERF contents back to the mapped main memory region prior to resetting the active bit. It should be noted however, that the use of these instructions is optional. If the instructions are not used, the register file will continue to be snooped, unnecessarily, during L1 cache snoops.

Thus, in various embodiments, the system and method for transparent handling of extended register states provides the advantages of a microprocessor having extra registers. Application software that takes advantage of the ERF can be written to be more register-intensive, which may result in significantly greater execution speed. The context save of a process using the ERF is simplified by mapping the ERF to a block in main memory. Since use of the ERF is controlled by application software, there is no need to modify the operating system to make the extended registers architecturally visible.

BRIEF DESCRIPTION OF THE DRAWINGS

Other objects and advantages of the invention will become apparent upon reading the following detailed description and upon reference to the accompanying drawings in which:

FIG. 4 is a listing of the additional instructions for operations involving the extended register file;

FIG. 5 is a state transition table illustrating the state of the status vector register for various extended register file operations.

Figure 1:
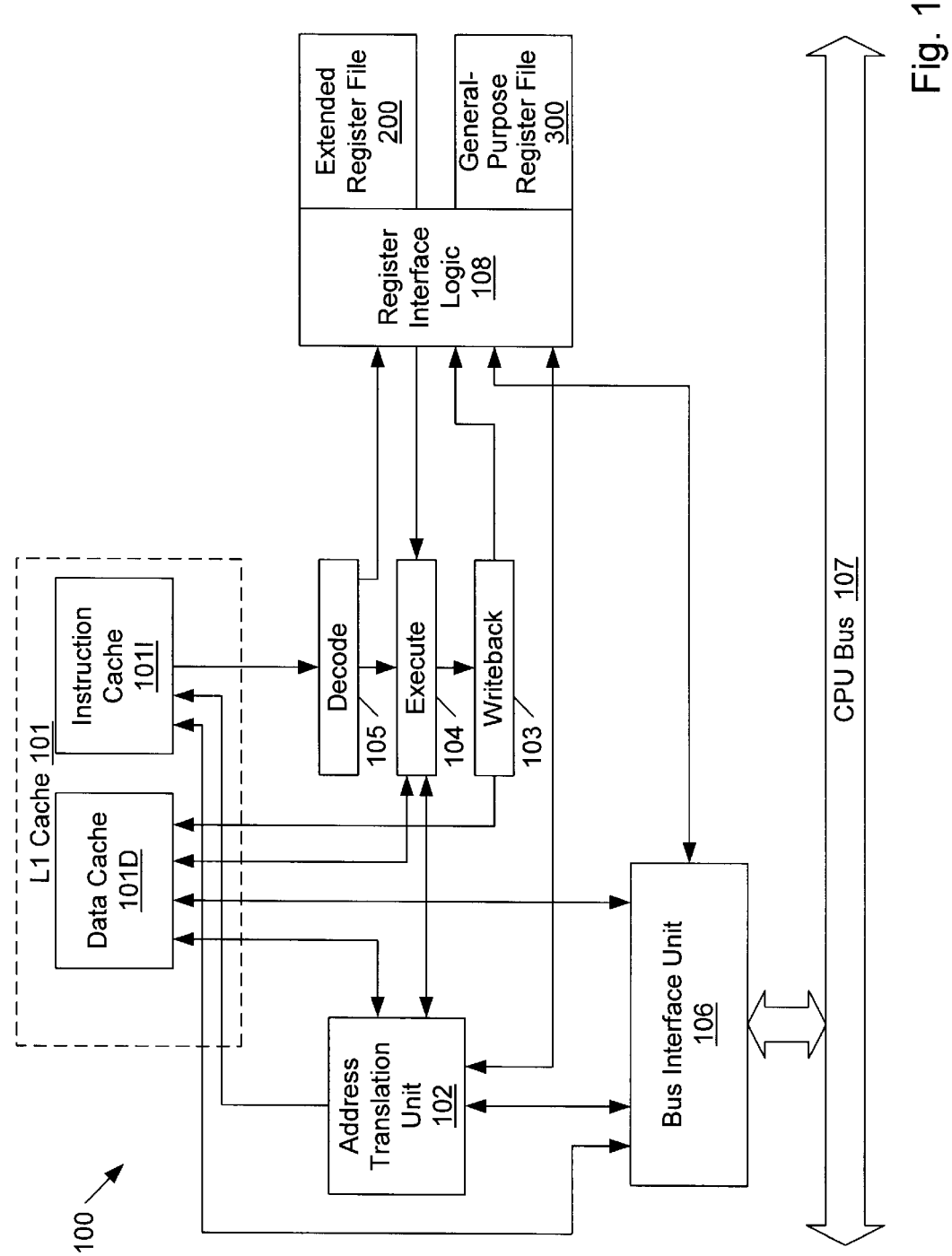
FIG. 1 is a block diagram of a microprocessor having an extended register file.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scoped of the present invention as defined be the appended claims.

DETAILED DESCRIPTION OF THE INVENTION

Turning now to FIG. 1, a block diagram of a microprocessor 100 having an extended register file is shown. The microprocessor 100 includes a Level 1 (L1) cache 101, which is made up of a data cache 101D and an instruction cache 101I. Also included in the microprocessor is an address translation unit 102, a writeback unit 103, and execution unit 104, a decode unit 105, a bus interface unit 106, a CPU bus 107, register interface logic 108, and extended register file (ERF) 200, and a general-purpose register file 300. Interconnections and operations between these units will be described in further detail below.

As previously stated, L1 cache 101 is composed of two high-speed cache memories, a data cache 101D and an instruction cache 101I. Instruction cache 101I is coupled to decode unit 105. This decode unit receives instructions from the instruction cache, decodes them, and forwards the decoded result to execute stage 104. The decode stage is also coupled to register interface logic 108 for the purpose of requesting operands stored in either the general-purpose register file 300 or ERF 200. Execution unit 104 then executes the instruction and forwards the results to writeback unit 103. Writeback unit 103 then forwards the results to either the registers, via register interface logic 108, or to data cache 101D.

Address translation unit 102 performs that task of translating virtual addresses to physical addresses. This unit is directly coupled to both data cache 101D and instruction cache 101I, and provides translated addresses for determining if the requested data is stored in its respective cache memory. Address translation unit is also coupled to bus interface unit 106, which in turn is coupled to CPU bus 107. Addresses from main memory are forwarded to address translation unit 102 via CPU bus 107 and bus interface unit 106, allowing virtual-to-physical address translations for main memory accesses. Address translation unit 106 is also directly coupled to register interface logic 108 for performing address translations necessary for operations involving ERF 200, as will be discussed in further detail below. Address translation unit 102 may contain a segmentation unit, a paging mechanism, a translation lookaside buffer (TLB), and/or other logic circuitry that is involved in performing virtual-to-physical address translations.

Bus interface unit 106 is directly coupled to CPU bus 107, and is the gateway for communications between microprocessor 100 and all external units of the computer system. In addition to address translation unit 102, bus interface unit 106 is directly coupled to data cache 101D, instruction cache 101L, and register interface logic 108. This allows for the transfer of data to and from main memory for each of the units mentioned.

Register interface logic 108 is coupled to both the ERF 200 and the general purpose register file 300. As previously stated, register interface logic 108 receives register access requests from decode unit 105 during the decoding of processor instructions. In response, the register interface logic will access the appropriate register data and provide it to the execution unit 104. Data stored in the registers is typically in the form of operands for arithmetic and logical instructions. Writeback unit 103 is also coupled to register interface logic for the purposes of writing back to the registers the results of instructions executed in execution unit 104.

Address translation unit 102 is coupled to register interface logic 108, and plays a critical role in the mapping of the ERF 200 to main memory. When a process or task requires access to the ERF, the ERF must be loaded from a memory region. The base address of this memory region is stored as a virtual address in one of the general-purpose registers. For example, in one embodiment, an X86 processor will store the virtual address of the mapped memory region in the general-purpose register EDI. In order to actually access the required information from the designated memory region, register interface logic 108 forwards the virtual address to address translation unit 102, where a virtual-to-physical address translation is performed. The physical address is then sent back to register interface logic 108, where it is forwarded to a base address register in the ERF. Register interface logic 108 also forwards the physical address of the memory region to bus interface unit 106. A memory cycle is then initiated and the ERF is loaded from the designated region of main memory.

Figure 2:
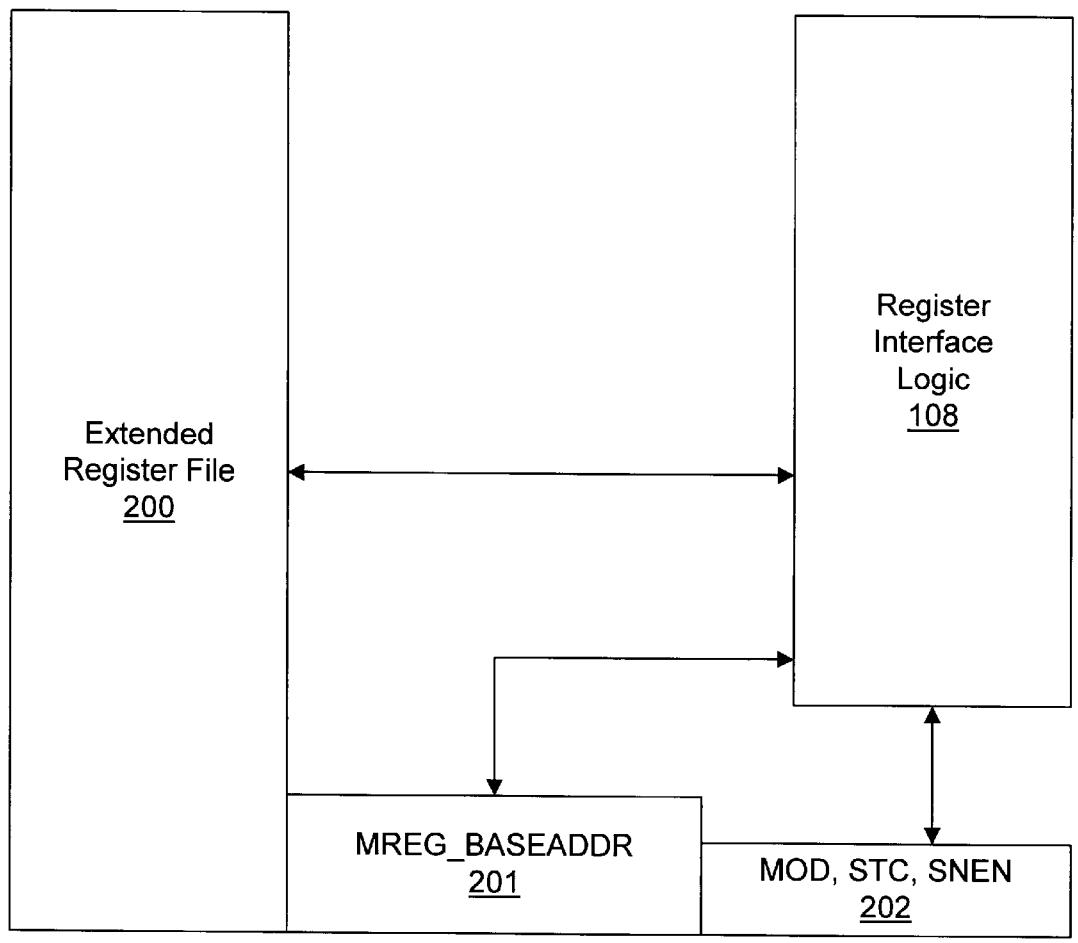
FIG. 2 is a block diagram of the extended register file architecture and the register interface logic.

Moving to FIG. 2, a block diagram illustrating the architecture of ERF 200 is shown, along with register interface logic 108. The primary component of ERF 200 is a plurality of general-purpose registers (not to be confused with the registers of general-purpose register file 300). These registers are typically used to store operands for arithmetic and logic instructions. ERF 200 is coupled directly to register interface logic for data exchanges between the registers and other units of the microprocessor. Also coupled to register interface logic is a special-purpose register, base address register 200, designated as mreg_baseaddr in this embodiment. This register is used to store the physical base address of the memory region to which the ERF is mapped.

Another special purpose register coupled to register interface logic 108 is status vector register 202. This register stores status bits, which provide information on the current state of ERF 200. In this embodiment, status vector register 202 stores three status bits, designated here are MOD, STC, and SNEN. The MOD status bit may also be referred to as the active status bit; when set, it indicates that ERF 200 is in use by a given task. Setting the active status bit also indicates that the ERF contents may have been modified. When in the reset state, the active status bit indicates that the ERF is available for use by any task requesting access. The STC bit is known as the state change bit, and is set whenever an interrupt or exception occurs. The SNEN bit is known as the snoop enable bit, and is also set following an interrupt or exception. When set, the snoop enable bit allows the ERF to be snooped during L1 cache snoops. This allows for coherency between the ERF and the main memory region to which it is mapped.

Figure 3:
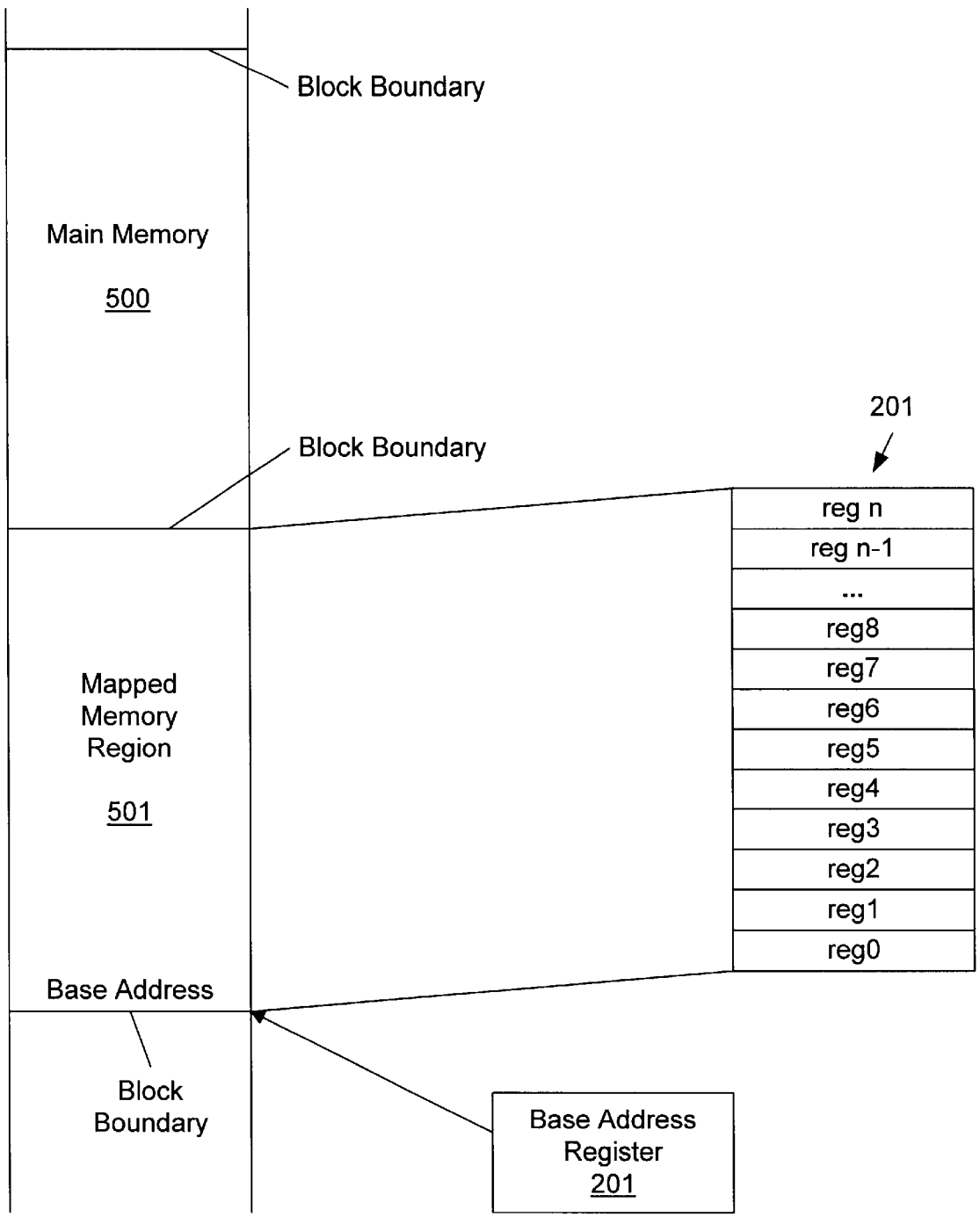
FIG. 3 is a block diagram illustrating the mapping of the extended register file to a region of main memory.

FIG. 3 is a block diagram illustrating the mapping of ERF 200 to a region in main memory. Main memory 500 is divided into a number of evenly sized logical blocks, as shown by the block boundaries in the diagram. ERF 200 is mapped to a logical block 501. This block is used to store the information loaded into the ERF prior to its use, as well as being the location for a writeback of data from the ERF, such as that which would occur on a context switch. The physical base address of logical block 501 is specified by base address register 201. The alignment of the mapping on logical block boundaries is important, as it allows the entire ERF to be snooped with a single snoop to the base address register. It should be noted that a separate memory block may be reserved by each task which uses the ERF.

Turning now to FIG. 4, a listing of the additional instructions for operations involving the ERF of one embodiment is shown While these instructions are specific to the ERF, other instructions, such as arithmetic and logical instructions, may also result in accesses to the ERF. In all, four new instructions are implemented. The ƒx2rmov instruction moves data from an extended register to a regular register (i.e. a register within the general-purpose register file). The r2ƒxmov instruction performs the opposite function, moving data from a regular register to and extended register. This instruction can also be used to initialize the ERF. Two instructions are available to mark the end of ERF usage. The first of these is the ƒxinv instruction, which invalidates the ERF by simply resetting the active status bit. The ƒxwbinv instruction performs the same function, however, it first performs a writeback of the ERF contents into the main. It should be noted that the usage of the ƒxinv or ƒxwbinv at the end of ERF usage is not explicitly required. However, if these instructions are not used, a small performance penalty may result, as extra snooping overhead can occur during L1 cache snoops.

Since operations on the ERF are transparent to the operating system, implementation of the new instructions will typically occur through a compiler in which an application using the ERF is written. Since the new instructions represent extensions to the assembly language of a given processor, code employing these instructions may be directly inserted into the source code of an application using a compiler configured with the given instructions. Moving now to FIG. 5, a state transition table illustrating the state of the status vector register for various ERF operations in one embodiment is shown. The state of each of the status bits following a given operation. These operations will now be described in further detail. Note that in this table the active status bit is referred to as M, the state S change bit is referred to as ST, and the snoop enable bit is referred to as SN.

Following an initial access to the ERF by a given task, the status bits will be set to the following: M=1, ST=0, and SN=0. This means that the ERF is active and in use by the task that initialized it. Furthermore, since the snoop enable bit is in a reset state (i.e. logic 0), the ERF is not visible to memory, and thus will not be snooped during memory accesses (as is the L1 cache during memory accesses). If an interrupt or exception occurs, both the state change and snoop enable bits will be set (ST=1, SN=1). This occurs regardless of the state of the active status bit (M=X). However, the active status bit will remain in the state it was prior to the exception. After the snoop enable bit is set, the ERF is visible to memory, and will be snooped during L1 cache snoops. A snoop hit in this situation indicates that another process or task is attempting to access an address of the main memory region that the ERF is mapped to for that process. If a snoop hit occurs while the active bit is set (M=1), the contents of the ERF will be copied back to the main memory region to which it is mapped, and the M bit will be reset (M=0). Copying the ERF contents back to the main memory region ensures coherency. If a snoop hit occurs while M=0, the contents of the ERF are not copied back to main memory, as coherency is ensured. If no snoop hit occurs, the status vector will remain in the same state it was immediately following the exception/interrupt.

Following an interrupt, a new task or process may need access to the ERF. It is also possible that the process running prior to the interrupt will be allowed to resume. As such, the ERF must be loaded with the state of the process from the main memory region in which it is stored. If the state change bit is in a reset state (i.e. logic 0), then the ERF is loaded in the manner of an initial access, as described above. If the state change bit is set, then an address compare must be performed. The virtual base address, stored in a register of the general-purpose register file, is translated into a physical address. The translated address is then compared to the address in the base address register of the ERF. If the addresses match, and the active status bit is reset (M=0), then the ERF is directly loaded from the memory region designated by the address stored in the base address register. The active status bit is set (M=0), while the state change and snoop enable bits are reset (ST=0, SN=0).

If the address compare results in a match, and the active status bit is set (M=1), no ERF load occurs. The status bits will then be set to M=1, ST=0, and SN=0. In this case, the ERF state is the state of the resuming process. The ERF is designed for a context switch on demand only. Thus, if an interrupt or exception occurs, the ERF state will be unloaded only when another task needs access to the ERF, or if another task accesses the associated mapped memory region. Otherwise, the ERF state will remain loaded until the associated process resumes. It should also be noted that the operating system will control the state save of the general-purpose register file during a context switch.

If the address compare does not result in a match while the active status bit is reset, the ERF is loaded from the address in the base address register, and the status bits are set to M=1, ST=0, and SN=0. In this case, the ERF contents are not written back to the main memory region, since coherency is not an issue when the ERF is inactive. Conversely, if no address match occurs and the active status bit is set, then the ERF contents must be copied back to their associated main memory region before loading the state of the new process. Following the write to main memory, the base address register is loaded with the new base address (i.e. the address that was translated from the general-purpose register file). The ERF is then loaded from the memory region pointed to by the new base address, and the status bits are set to M=1, ST=0, and SN=0. Subsequent accesses to the ERF will not result in an address compare, since the state change status bit is reset, nor will they result in an update of the mapped main memory region, since the snoop enable bit is reset.

Figure 6:
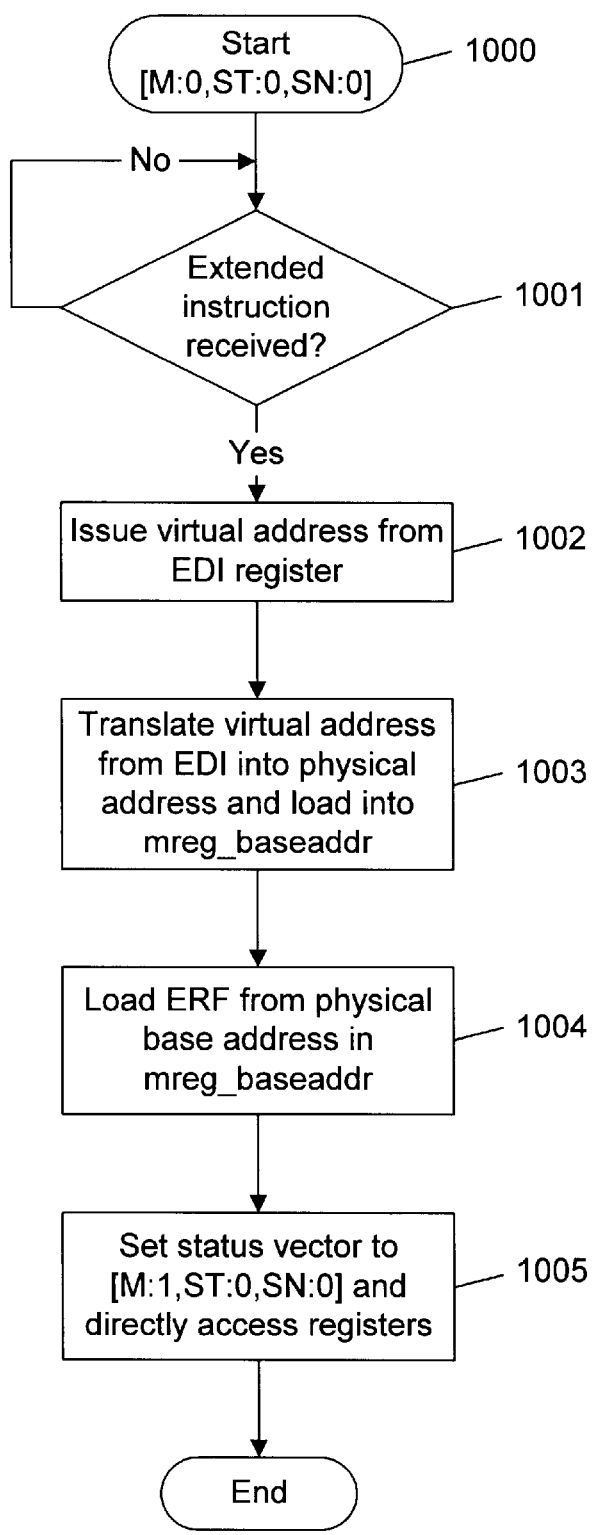
FIG. 6 is a flowchart illustrating operations of the extended register file for an initial access.

Operations involving the ERF are further illustrated in flowcharts, beginning with FIG. 6, which is a flowchart illustrating operations of the extended register file for an initial access. Before any register operations have commenced, all three status bits are in a reset state, in step 1000. If no extended instruction is received at step 1001, the ERF will remain idle. If an extended register instruction is received, ERF operations will commence. Extended register instructions include the instructions previously discussed in reference to FIG. 4, as well as any arithmetic, logical, or other instructions that may use the extended registers. Following receipt of an extended instruction, register operations commence when the virtual base address is sent to an address translation unit (Step 1002). In this embodiment, the virtual base address is stored in the general-purpose EDI register of an X86 processor. In step 1003, the virtual base address is received by the address translation unit, and is translated into a physical address and loaded into the base address register (designated mreg_baseaddr in this embodiment) of the ERF. With the base address register loaded, the full ERF load may now commence, as in step 1004. Recall from previous discussion that the memory region to which the ERF is mapped is aligned on an even block boundary. Thus, the ERF load will begin at the base address pointed to by the base address register, and will continue until the entire block has been written into the ERF. With the ERF load complete, the status vector is set to M=1, ST=0, and SN=0 in step 1005.

Figure 7:
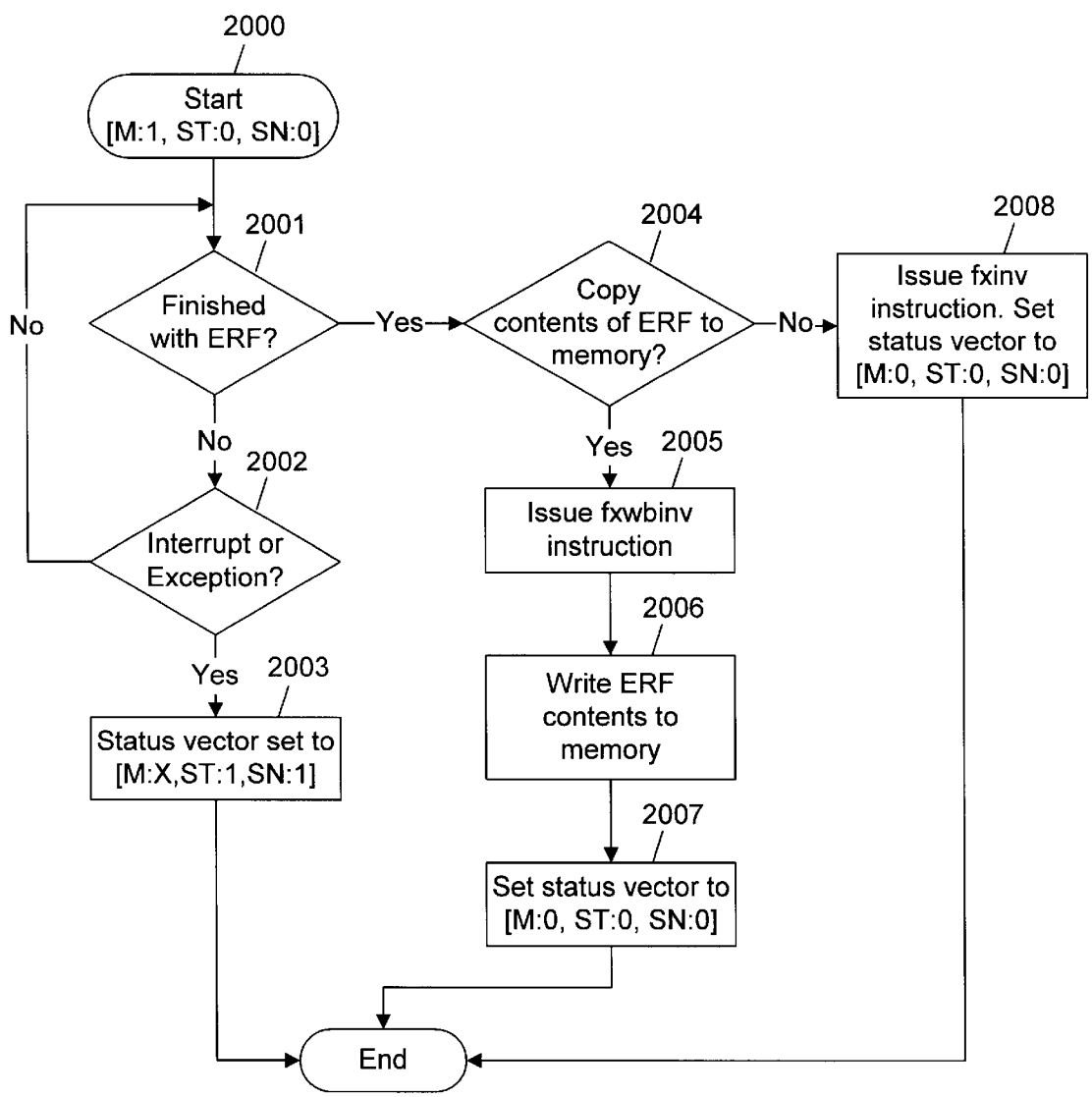
FIG. 7 is a flowchart illustrating operations during interrupts and end of extended register file usage.

FIG. 7 is a flowchart illustrating operations during interrupts and end of extended register file usage. The chart begins at step 2000, with a process employing the ERF running. The status vector in this state is M=1, ST=0, and SN=0. If the process is not finished running, step 2001, it will continue until finished, or an interrupt/exception occurs, step 2002. Following the interrupt/exception, the state change and snoop enable bits are set in step 2003. The active status bit may remain set, or an instruction subsequent to the interrupt/exception may reset the bit.

If a given process is allowed to run to completion, or if it no longer requires use of the ERF, it may choose to invalidate the ERF contents, as in step 2004. To invalidate the ERF, one of the instructions discussed in FIG. 4 must be issued. If the contents of the ERF are to be copied back to memory prior to invalidating the ERF, the ƒxwbinv instruction is issued, as shown in step 2005. Following receipt of this instruction, the contents of the ERF are written back to main memory in step 2006. Once the write to memory is completed, each bit of the status vector is reset, and the ERF is available for use by another process.

Alternatively, the ƒxinv instruction can be issued, as shown in step 2008. In this case, the contents of the ERF are not written back to main memory. The only effect of this instruction is to reset each of the status vector bits.

It should be noted, as previously discussed, that the usage of the ƒxwbinv or ƒxinv instructions are not required at the end of ERF usage. However, a performance penalty may result due to extra snooping overhead should these instructions not be used.

Figure 8:
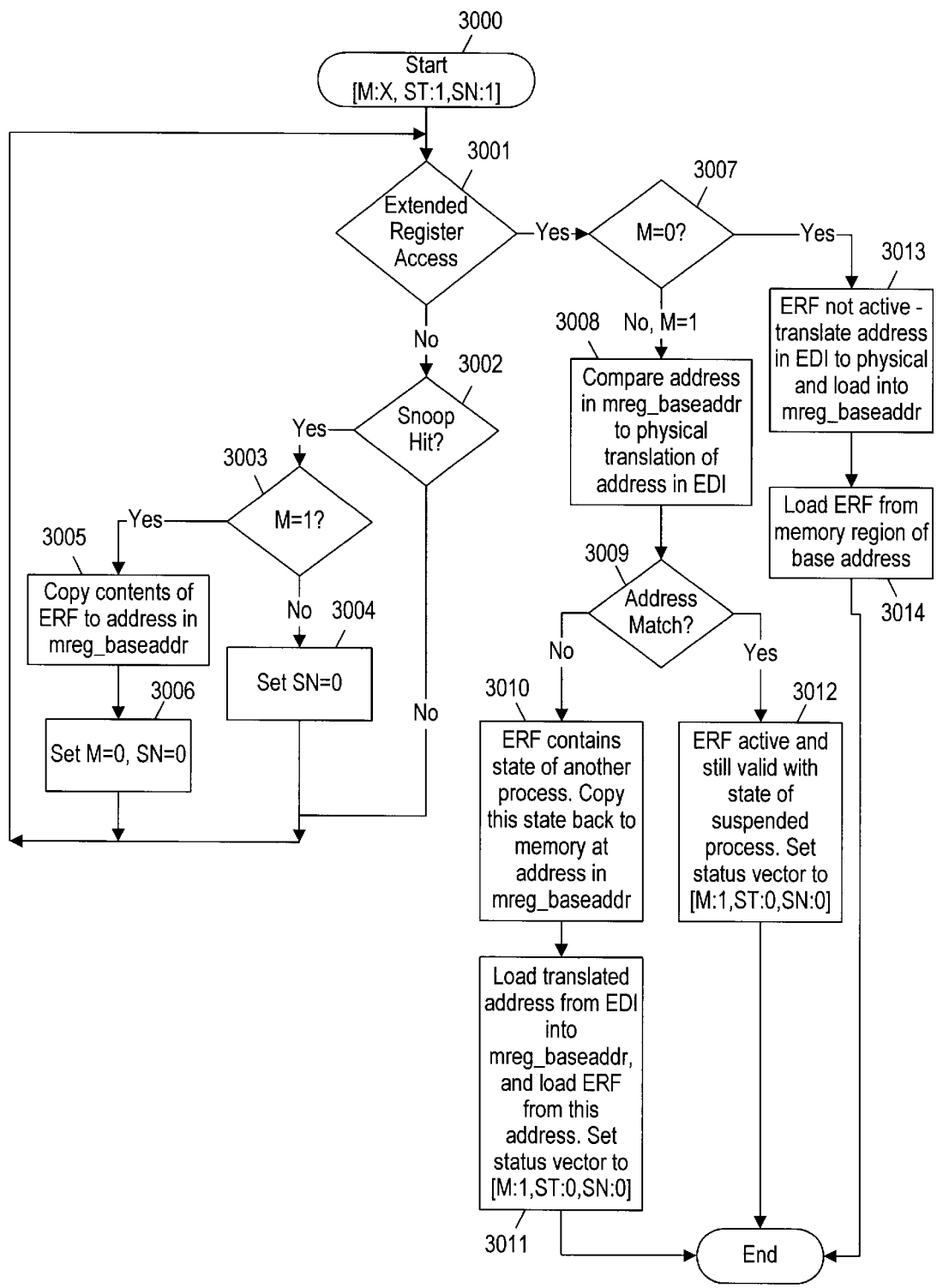
FIG. 8 is a flowchart illustrating operations during cache snoops and extended register file loads/reloads following and exception or interrupt.

Turning to FIG. 8, a flowchart illustrating operations during cache snoops and extended register file loads/reloads following and exception or interrupt is shown. The chart begins with step 3000, with state change and snoop enable bits, while the active status bit can be set or reset. At this point, the ERF is snoop enabled, so L1 cache snoops will also snoop the ERF. If a task does not need ERF access (step 3001), snooping will continue in the event a process attempts to access the memory region that the most recent ERF context was mapped to (step 3002). No change will occur if no snoop hit occurs. However, if a snoop hit occurs, and the active status bit is set (step 3003), the contents of the ERF will be copied to the memory location specified by the base address register (step 3005). Following the write to memory, the active and snoop enable status bits will be reset in step 3006. If a snoop hit occurs while the active status bit is reset, the snoop enable bit will then be reset as well (step 3004).

Following an interrupt or exception, a new process may require access the ERF, or the previous process may resume (yes in step 3001). Before accessing the ERF, the active status bit is checked in step 3007. If the active status bit is in a reset state, the virtual address stored in a general-purpose register (EDI of an X86 processor in this embodiment) is translated to a physical address and loaded into the base address register (step 3013). Next, the ERF is loaded into main memory from the block specified by the base address (step 3014).

If the active status bit is found to be set in step 3007, a direct comparison of addresses is performed. The virtual base address in the EDI register is translated into a physical address, and compared with the physical base address in the base address register, mreg_baseaddr (step 3008). If the addresses match, the state currently loaded in the ERF is valid for the process requesting access. As a result, the only change made is to reset the state change and snoop enable bits, making the status vector M=1, ST=0, and SN=0 (step 3012). This situation can occur when a task resumes following an interrupt or exception, where the interrupting task did not access the ERF.

If, in step 3009, the addresses do not match, the ERF contents must written back to memory before the new task can access the extended registers. This occurs in step 3010. In step 3011, the physical translation of the address stored in the EDI register is then loaded into the base address register, and the ERF is loaded from the memory block specified by the base address (step 3011). With the ERF loaded, the status vector is set to M=1, ST=0, and SN=0.

Figure 9:
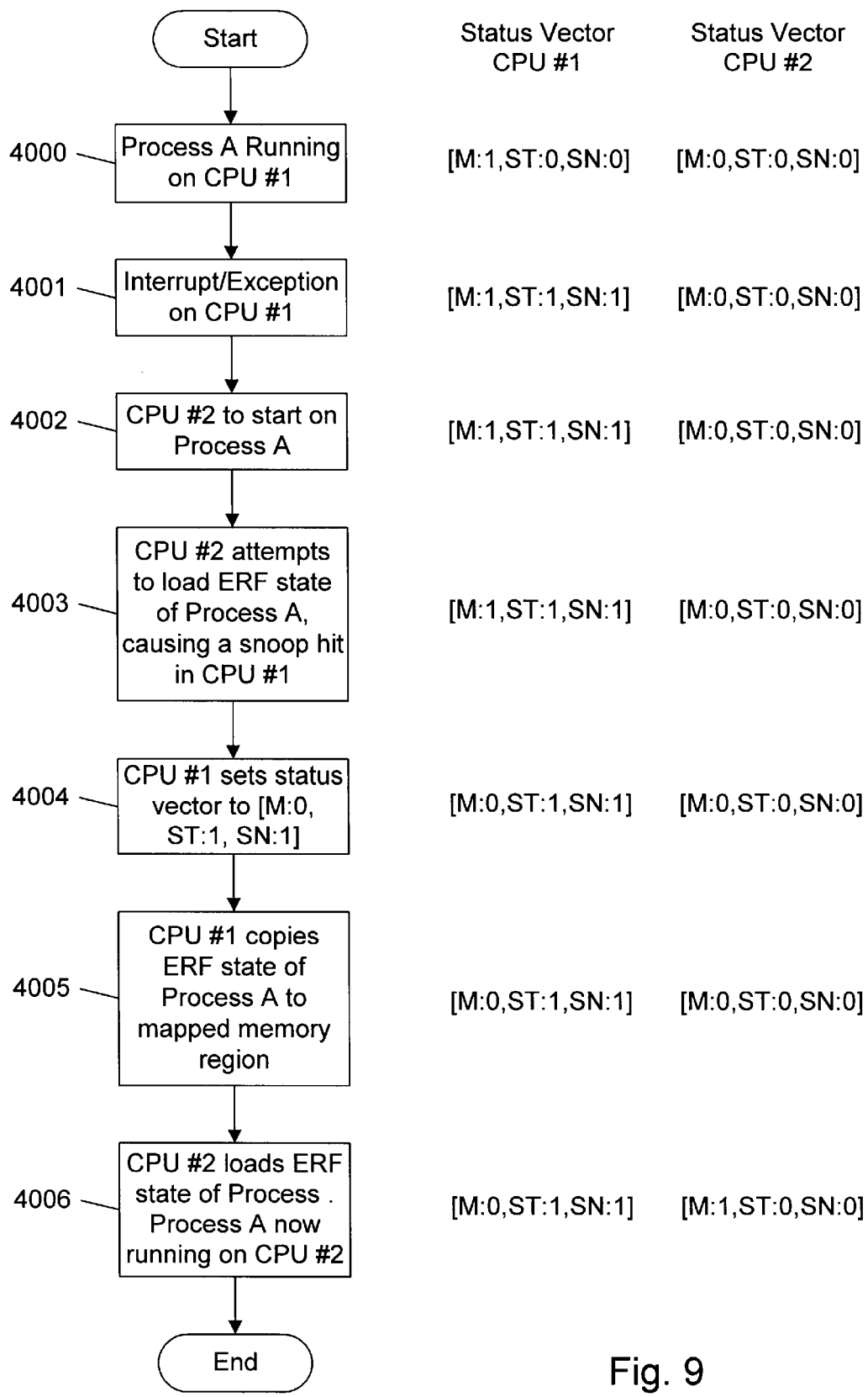
FIG. 9 is a flow diagram illustrating how a processor in a multi-processing system can take over a task that has been suspended on another processor, where both processors have an extended register file.

Moving on to FIG. 9, a flow diagram illustrating how a processor in a multiprocessing system can take over a task that has been suspended on another processor, where both processors have an extended register file is shown. The ability to resume a task allows a processor employing the ERF to be used in multiprocessor systems, such as servers. In step 4000, a Process A is running on CPU #1. The status vector in Processor #1 is set to M=1, ST=0, and SN=0. In step 4001, Process A is suspended on CPU #1 by an interrupt or exception, setting both the state change and snoop enable bits. CPU #2 then attempts to resume Process A in step 4002. In order to resume process A, CPU #2 must first load the ERF state from the main memory region to which it is mapped. When CPU #2 attempts to load the ERF state, the result will be a cache hit in CPU #1 (step 4003). CPU #1 will then reset its active status bit (step 4004), and copy the ERF contents back to the main memory (step 4005). With the contents of Process A in main memory, CPU #2 can now load its ERF (step 4006) and set its status vector to M=1, ST=0, and SN=0. At this point, CPU #2 has successfully resumed Process A.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the invention as detailed within the following claims.

What is claimed is:

1. A computer system comprising:
   an operating system;
   a microprocessor configured to execute standard instruction set sequences and extended instruction set sequences, wherein said microprocessor includes:
      a general-purpose register file including a first plurality of registers;
      an extended register file including a second plurality of registers, a base address register for mapping said extended register file to a main memory region, and a status vector register for storing status bits, wherein operations involving said extended register file are transparent to said operating system, and, wherein said extended register file is mapped to a main memory region.

2. The computer system as recited in claim 1 further comprising an application program, wherein access to said extended register file is controlled by said application program.

3. The computer system as recited in claim 1, wherein a virtual base address of said main memory region is stored in one of said general-purpose registers of said general-purpose register file.

4. The computer system as recited in claim 3, wherein said base address register is configured to store a physical base address of said main memory region, said physical base address obtained by performing a virtual-to-physical address translation on said virtual base address.

5. The computer system as recited in claim 1, wherein said microprocessor includes register interface logic for accessing said general-purpose register file and said extended register file.

6. The computer system as recited in claim 1, wherein said main memory region is configured to store the state of said extended register file during a context switch.

7. The computer system as recited in claim 1, wherein said status vector register includes an active bit to indicate said extended register file is active.

8. The computer system as recited in claim 7, wherein said active bit is set whenever the extended register file is in an active state.

9. The computer system as recited in claim 1, wherein said status vector register includes a change status bit to indicate whether a task switch has occurred.

10. The computer system as recited in claim 9, wherein said change status bit is set upon the occurrence of a task switch.

11. The computer system as recited in claim 1, wherein said status vector register includes a snoop enable bit to indicate whether said extended register file is to be snooped during L1 cache snoops.

12. The computer system as recited in claim 11, wherein said snoop enable bit is set upon the occurrence of a task switch.

13. The computer system as recited in claim 12, wherein said extended register file will be snooped during L1 cache snoops whenever said snoop enable bit is set.

14. A method of operating a microprocessor comprising:
   executing a first task including standard instruction set sequences and extended register instruction set sequences;
   accessing a general-purpose register file, wherein said general purpose register file is visible to an operating system;
   storing a virtual address corresponding to a main memory region in a register of said general purpose register file;
   accessing an extended register file, said extended register file including a base address register and a status vector register, and, wherein said extended register file is transparent to said operating system;
   storing a physical address corresponding to said main memory region in said base address register;
   suspending said first task and beginning a second task, wherein said second task includes standard instruction set sequences and extended instruction set sequences;
   storing the state of said extended register file corresponding to said first task in a main memory region, wherein said extended register file is mapped to said main memory region, in response to said second task requesting access to said extended register file;
   reloading said state of said extended register file corresponding to said first task upon resumption of said first task.

15. The method as recited in claim 14, wherein said operating system will store state of said general-purpose register file during a context switch.

16. The method as recited in claim 14, wherein said status vector register includes an active bit for indicating that said extended register file is active.

17. The method as recited in claim 16, wherein said active bit is set in response to an initial access of said extended register file by a given task.

18. The method as recited in claim 14, wherein said status vector register includes a state change bit for indicating that a task change has occurred.

19. The method as recited in claim 18, wherein said state change bit is set in response to a task switch.

20. The method as recited in claim 14, wherein said status vector register includes a snoop enable bit for indicating that said extended register file is to be snooped during L1 cache snoops.

21. The method as recited in claim 20, wherein said snoop enable bit is set in response to a task switch.

22. The method as recited in claim 21, wherein snoops of extended register file occur when said active bit and said snoop enable bit are both set.

23. The method as recited in claim 22, wherein a snoop hit of said extended register file will result in the contents of said extended register file being copied back to said main memory region.

24. The method as recited in claim 14, wherein said extended register instruction set sequences include instructions for moving data between said general-purpose register file and said extended register file.

25. The method as recited in claim 24, wherein said extended register instruction set sequences include an instruction for deactivating said extended register file.

26. The method as recited in claim 25, wherein said extended register instruction set sequences include an instruction for writing contents of said extended register file to main memory upon deactivation of said extended register file.

27. A microprocessor comprising:
- a level one (L1) cache memory configured to store data and instructions, wherein said L1 cache is divided into an instruction cache and a data cache;
- a general-purpose register file including a first plurality of registers;
- an extended register file including a second plurality of registers, a base address register for mapping said extended register file to a main memory region and a status vector register for storing status bits;
- register interface logic for accessing said general-purpose register file and extended register file;
- a decode unit for decoding instructions received from said instruction cache;
- an execution unit coupled to said decode unit, said execution unit configured to execute instructions received from said decode unit;
- a writeback unit coupled to said execution unit, said register interface logic, and said data cache, wherein said writeback unit is configured to receive results of an executed instruction from said instruction unit and forward said results to said data cache and/or said register interface logic;
- an address translation unit configure to perform virtual-to-physical address translations;
- a CPU bus;
- a bus interface unit coupled to said CPU bus, said L1 cache, said address translation unit, and said register interface logic.

28. The microprocessor as recited in claim 27, wherein a virtual base address of said main memory region is stored in one of said general-purpose registers of said general-purpose register file.

29. The microprocessor as recited in claim 28, wherein said base address register is configured to store a physical base address of said main memory region, said physical base address obtained by performing a virtual-to-physical address translation on said virtual base address.

30. The microprocessor as recited in claim 29, wherein said main memory region is configured to store the state of said extended register file during a context swap.

31. The microprocessor as recited in claim 27, wherein said status vector register includes an active bit to indicate said extended register file is active.

32. The microprocessor as recited in claim 27, wherein said active bit is set whenever the extended register file is in an active state.

33. The microprocessor as recited in claim 32, wherein said active bit is set whenever the extended register file is in an active state.

34. The microprocessor as recited in claim 27, wherein said status vector register includes a change status bit to indicate whether a task switch has occurred.

35. The microprocessor as recited in claim 34, wherein said change status bit is set upon the occurrence of a task switch.

36. The microprocessor as recited in claim 27, wherein said status vector register includes a snoop enable bit to indicate whether said extended register file is to be snooped during L1 cache snoops.

37. The microprocessor as recited in claim 36, wherein said snoop enable bit is set upon the occurrence of a task switch.

38. The microprocessor as recited in claim 27, wherein instructions from an operating system are executed in said execution unit.

39. The microprocessor as recited in claim 38, wherein said operating system is configured to save the state of said general-purpose register file during a context switch.

40. The microprocessor as recited in claim 39, wherein operations involving said extended register file are transparent to said operating system.

41. The microprocessor as recited in claim 27, wherein instructions from an application program are executed in said execution unit.

42. The microprocessor as recited in claim 41, wherein said instructions include instructions for accessing said extended register file.

43. The microprocessor as recited in claim 42, wherein said application program is configured to save the state of said extended register file during a context switch.

* * * * *